UNITED STATES PATENT OFFICE.

ALFRED DE BRAYER, OF PARIS, FRANCE.

SUBSTANCE FOR USE IN PHOTOGRAPHY AND METHOD OF MAKING THE SAME.

1,277,048.     Specification of Letters Patent.     Patented Aug. 27, 1918.

No Drawing.     Application filed April 20, 1917. Serial No. 163,436.

*To all whom it may concern:*

Be it known that I, ALFRED DE BRAYER, a citizen of the French Republic, and resident of 38 Rue Etienne Marcel, Paris, France, have invented certain new and useful Improvements in Substances for Use in Photography and Methods of Making the Same, of which the following is a specification.

The present invention relates to improvements in substances for use in photography and method of making the same, and has for its principal object to produce such substances in a form such that the washing of the plates, films and photographic papers, after the same have been treated with such substances, may be effectively controlled. Another object is to manufacture the said substances in such a manner that they may be kept for an indefinite period of time without losing their original properties.

All photographers know the difficulty which exists in noting the moment when the washing of a plate, a film or paper print is finished, in other words in recognizing the moment when the elimination of the products such as sodium hyposulfite, which are injurious to the preservation of the pictures, has been reached in an effective manner. According to the present invention this difficulty is solved in a very simple manner. For this purpose during preparation there is added to the substance which is afterward to be eliminated by washing, a suitable coloring material such for example as an anilin dye, chosen and carefully proportioned in such a manner that the coloration which it imparts to the emulsion disappears by washing at the same time as the last traces of the deleterious substances are eliminated. It will be understood that different colors are preferably chosen for different substances, which helps in the avoidance of any errors in the use of these substances.

The method employed according to the present invention consists principally in incorporating the various photographic substances and coloring material in a finely divided condition in a syrupy or viscous liquid, soluble in water, such as syrup of sugar, glucose, glycerin, alkali silicates either alone or mixed together, and in general in all other suitable products whether neutral, acid or alkaline, according to requirements, in so far as they possess the property of preserving indefinitely a pasty form. The mixture is prepared by grinding and kneading the products together; a pasty material of any desired consistency or stiffness is thus obtained according to the proportions used; the photographic substance is distributed throughout this paste and each particle of this substance may be regarded as being inclosed in a globule of the syrupy material; these particles are thus sheltered from atmospheric influences which could change them, their preservation being thus insured in an effective manner.

It will be understood that the syrupy or viscous substances used as vehicles for the photographic substance must be so chosen that they do not exert any deleterious action on the substances embodied or enveloped therein.

Pastes thus formed are inclosed in collapsible tubes of tin or of any other analogous or suitable material, these tubes if required being coated internally with an insulating or protecting varnish, whenever the substances used are liable to attack the metal. The preservation of the substances is thus doubly assured, as in a tin tube they are always protected from the atmosphere.

The solution of the substances is practically instantaneous in view of the extremely fine subdivision thereof in the paste, and the effective preservation of the substances which avoids any risk of change of consistency. Such change of consistency often renders the solution of certain photographic substances difficult.

Having thus described my invention what I claim as new and desire to secure by Letters Patent is:—

1. The method of conserving and preparing substances for use in photography, consisting in preparing a pasty mass with such substances and a viscous body adapted to act as a soluble and non-deleterious vehicle for the same, and adding to such mass a small proportion of a coloring matter adapted to stain the reagent, whereby the color is made apparent on any photographic image bearing some of the reagent until such reagent is completely washed out from such image.

2. As an article of manufacture, a substance for use in photography consisting of a chemical reagent thoroughly incorporated with a viscous body adapted to act as a vehicle which is soluble in water, which preserves the reagent from atmospheric and other actions for an indefinite period, and which does not exert any deleterious reaction in the use of the reagent for photographic purposes, in combination with a small proportion of a coloring matter thoroughly mixed with the reagent and adapted to serve as an indicator showing when the last traces of the reagent have been completely washed out from a photographic image in the preparation of which said reagent has been utilized.

ALFRED DE BRAYER.